W. C. LIPE.
FRICTION CLUTCH.
APPLICATION FILED DEC. 7, 1905.
1,004,047.
Patented Sept. 26, 1911.
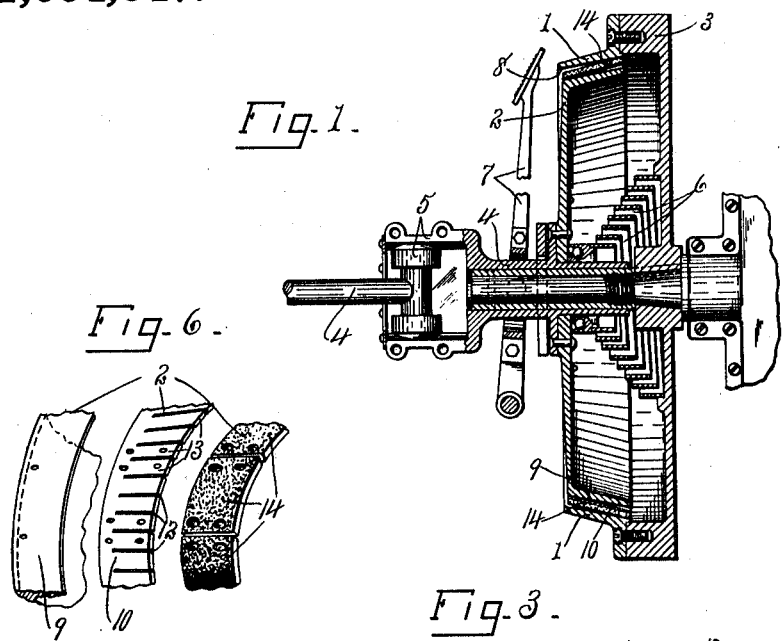
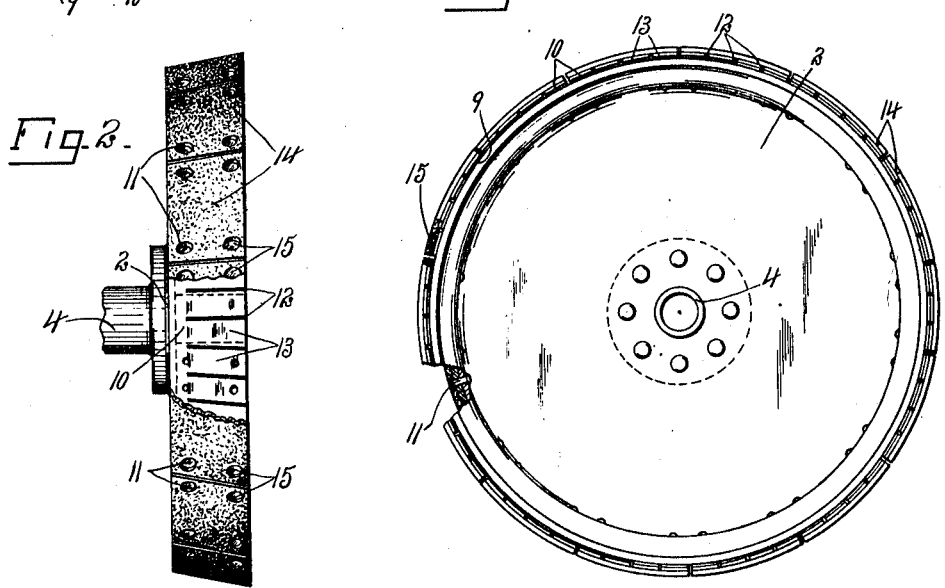
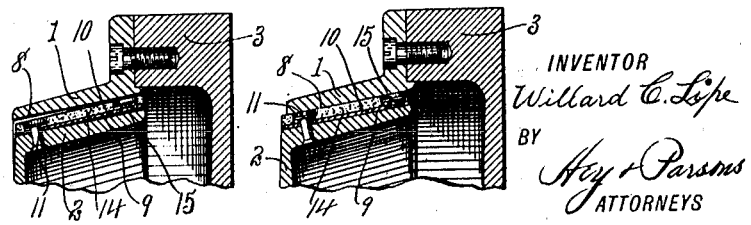
WITNESSES:
Chas. J. Toner.
Chas. H. Young.
INVENTOR
Willard C. Lipe
BY
Hey & Parsons
ATTORNEYS

UNITED STATES PATENT OFFICE.

WILLARD C. LIPE, OF SYRACUSE, NEW YORK.

FRICTION-CLUTCH.

1,004,047.          Specification of Letters Patent.      Patented Sept. 26, 1911.

Application filed December 7, 1905. Serial No. 290,673.

*To all whom it may concern:*

Be it known that I, WILLARD C. LIPE, of Syracuse, in the county of Onondaga and State of New York, have invented a certain new and useful Friction-Clutch, of which the following is a specification.

My invention has for its object the production of a friction-clutch which is particularly simple in construction and highly efficient and durable in use; and to this end, it consists in the combinations and constructions hereinafter set forth and claimed.

In describing this invention, reference is had to the accompanying drawing, in which like characters designate corresponding parts in all the views.

Figure 1 is a sectional view, partly broken away and in elevation, of one embodiment of my clutch and contiguous parts. Figs. 2 and 3, are, respectively, edge and face views, partly broken away, of one of the clutch-members. Figs. 4 and 5 are enlarged sectional views, partly in elevation, of a portion of my clutch, the relatively-movable member thereof being illustrated in Fig. 4 as disengaged from the other member of the clutch, and in Fig. 5, as engaged with said other member. Fig. 6 is a fragmentary view of detached parts of the clutch-member seen in Figs. 2 and 3.

This clutch comprises driving and driven members 1, 2, the driving member 1 being preferably carried by the flywheel 3 of a motor, not shown, and the driven member 2 being mounted on a revoluble member 4 including the universal joint 5 forming the subject-matter of my pending application, Sr. No. 289,020. The operative engagement and disengagement of the clutch-members 1, 2 may be effected in any desirable manner, as by a spring 6 for moving the member 2 axially in one direction into operative engagement with the member 1, and means, as a foot-lever 7, connected to the member 4 by a yoke and trunnions, or other suitable means, for moving the member 2 axially in the reverse direction against the action of the spring 6.

Although the illustrated and described means connected to the clutch-members 1, 2 for transmitting motion to and from the same and effecting the operative engagement and disengagement of the clutch-members is particularly applicable for use with my clutch, it is apparent that this invention is not restricted thereto, since any other suitable means may be used for such purpose.

One of the clutch-members, as the driving member 1, is formed with an internal frictional engaging surface 8 increasing in diameter toward one side, and the other clutch-member is provided with a peripheral surface 9 which increases in diameter in the same direction as said surface 8, and is opposed to the surface 8 and substantially concentric therewith, the conical surfaces 8 and 9 being immovable toward and from the axis of the clutch members. The surface 9 is encircled by a band 10 increasing in diameter toward one side and having one side secured by suitable fastening means, as rivets 11, to the surface 9. Said band 10 is provided with slots 12 extending inwardly from its opposite side and forming a plurality of spring-arms 13 which are arranged crosswise of the surface 9 and flare outwardly toward their free ends forming an expansible and compressible means between the surfaces 8 and 9. The band 10, although preferably composed of a single piece, may obviously consist of a plurality of sections or segments arranged one in advance of the other around the surface 9, and it will be apparent that if desired only a part of the surface 9 may be provided with said band or sections. The band 10 is usually provided with frictional engaging means generally consisting of a plurality of segments 14 of leather, or other suitable substance, arranged one in advance of the other in a ring-shaped series upon the outer face of the band each segment extending crosswise of such band, and the opposing edges of contiguous segments being preferably slightly separated from each other. Corresponding ends of the frictional engaging means or segments 14 are secured by rivets 15 to the free ends of the arms 13 of the band 10, and the opposite ends of said segments are secured to the other side of the band by the rivets 11. Each segment 14 is preferably of sufficient length to cover a number of the spring arms 13, and the segments 14, the spring arms 13 and the rivets 15 and 11 for securing the segments to the band 10 are so arranged that opposite portions of each segment are secured at their ends to the opposing or underlying spring arms, and consequently the parts of said opposite portions intermediate of the ends thereof are disconnected from the contiguous parts of said opposing spring arms, and the part of each segment intermediate of said opposing portions thereof is disconnected from one or more spring arms interposed between said opposing spring arms, thus enabling parts of the arms 13 and the segments 14 to yield or move relatively to each other in the operation of the clutch. When the clutch-member 2 is in its inoperative position, the spring-arms 13 force the overlying free portions of the frictional engaging means or segments 14 toward the coacting surface 8 of the clutch-member 1, and consequently, the engaging surfaces of said clutch-members are normally of different form. As the member 2 is forced axially the arms 13 yield radially, thus permitting compression of the band 10 and the ring of frictional engaging means 14 until the engaging surface of the member 2 conforms to, and closely fits, the coacting surface of the member 1. It will be understood that the frictional engaging means or segments 14 when worn may be replaced.

As will be obvious to those skilled in the art, my clutch operates with a minimum shock and strain upon the parts when the operative engagement of the clutch-members takes place.

What I claim as new, is:—

1. A friction-clutch comprising driving and driven members including opposing surfaces, frictional engaging means between said surfaces and substantially concentric therewith, a portion of such means being fixed relatively to one of the opposing surfaces, spring means interposed between the frictional engaging means and said one of the opposing surfaces and extending in a general direction axially of said members, the spring means normally holding a portion of the frictional engaging means away from the surface to which the same is fixed, said frictional engaging means being separable from the spring means, and means for moving one member axially relatively to the other, substantially as and for the purpose specified.

2. A friction-clutch comprising driving and driven members including opposing surfaces, frictional engaging segments interposed between said surfaces and arranged one in advance of the other in a ring-shaped series substantially concentric with said surfaces, spring means interposed between the segments and one of the opposing surfaces, and means for moving one member axially relatively to the other, substantially as and for the purpose set forth.

3. A friction-clutch comprising driving and driven members including opposing surfaces, frictional engaging segments interposed between said surfaces and arranged one in advance of the other in a ring-shaped series substantially concentric with said surfaces, a portion of each segment being fixed relatively to one of the opposing surfaces, spring means interposed between the segments and said one of the opposing surfaces for normally holding portions of the segments away from said surface, and means for moving one member axially relatively to the other, substantially as and for the purpose specified.

4. A friction-clutch comprising driving and driven members including opposing surfaces, frictional engaging segments interposed between said surfaces and arranged one in advance of the other in a ring-shaped series substantially concentric with said surfaces, contiguous edges of the segments being spaced apart, spring means interposed between the segments and one of the opposing surfaces, and means for moving one member axially relatively to the other, substantially as and for the purpose described.

5. A friction-clutch comprising driving and driven members including opposing surfaces, frictional engaging segments interposed between said surfaces and arranged one in advance of the other in a ring-shaped series substantially concentric with said surfaces, contiguous edges of the segments being spaced apart, and one end of each segment being fixed to one of the opposing surfaces and the opposite end of said segment being movable relatively to such surface, spring means interposed between the segments and said one of the opposing surfaces for normally holding the movable ends of the segments away from said surface, and means for moving one member axially relatively to the other, substantially as and for the purpose set forth.

6. A friction-clutch comprising driving and driven members including opposing surfaces, a spring fixed relatively to one of the opposing surfaces and having a portion thereof extending from said surface toward the opposing surface, frictional engaging means between the spring and said opposing surface, a portion of the engaging means being fixed relatively to the spring and fixed relatively to the surface upon which the spring is mounted and another portion thereof being capable of movement relatively to the spring, and means for moving one member axially relatively to the other, substantially as and for the purpose specified.

7. A friction-clutch comprising driving and driven members, one being shiftable axially relatively to the other, said members including opposing concentric conical surfaces immovable relatively toward their axis, expansible and compressible means arranged between the opposing surfaces, said means comprising a plurality of spring arms fixed at corresponding ends to one of the conical surfaces and normally flaring outwardly therefrom, and frictional engaging means carried by the spring arms and comprising a plurality of segments, each segment covering a number of said arms, substantially as and for the purpose described.

8. A friction-clutch comprising driving and driven members including opposing surfaces, a part fixed relatively to one of the opposing surfaces and having a plurality of integral spring arms, frictional engaging means interposed between said part and the other of the opposing surfaces, the free ends of a number of the spring arms being fixed to the frictional engaging means, and the free ends of others of said arms being capable of movement relatively to the frictional engaging means, and means for moving one member axially relatively to the other, substantially as and for the purpose set forth.

9. A friction-clutch comprising driving and driven members including opposing surfaces, a part fixed relatively to one of the opposing surfaces and having a plurality of integral spring arms at one side, and frictional engaging segments interposed between said spring arms and the other of the opposing surfaces, said segments being of greater width than the spring arms whereby a plurality of the spring arms engage a single segment, substantially as and for the purpose specified.

10. A friction-clutch comprising driving and driven members, one being shiftable axially relatively to the other, said members including opposing concentric conical surfaces immovable relatively toward their axis, expansible and compressible means arranged between the opposing surfaces, said means comprising a plurality of spring arms fixed at corresponding ends to one of the conical surfaces and normally flaring outwardly therefrom, and frictional engaging means carried by the spring arms and comprising a plurality of segments, each segment covering a number of said arms and being secured at its ends to one of the spring arms and having a part thereof intermediate of said ends disconnected from the opposing part of said spring arm, substantially as and for the purpose described.

11. A friction-clutch comprising driving and driven members, one being shiftable axially relatively to the other, said members including opposing concentric conical surfaces immovable relatively toward their axis, expansible and compressible means arranged between the opposing surfaces, said means comprising a plurality of spring arms fixed at corresponding ends to one of the conical surfaces and normally flaring outwardly therefrom, and frictional engaging means carried by the spring arms and comprising a plurality of segments, each segment covering a number of said arms and having opposite portions thereof secured to the opposing spring arms, and having a part thereof between said opposite portions disconnected from a spring arm between said opposing spring arms, substantially as and for the purpose set forth.

12. A friction-clutch comprising driving and driven members, one being shiftable axially relatively to the other, said members including opposing concentric conical surfaces immovable relatively toward their axis, an expansible and compressible band arranged between the opposing surfaces, the band being fixed at one side to one of said surfaces and normally flaring outwardly therefrom and being formed with slots extending from its opposite side toward its fixed side and forming a plurality of spring arms, and frictional engaging means carried by the band and comprising a plurality of segments, each segment covering a number of spring arms and having opposite portions thereof secured at their ends to the opposing spring arms, the parts of said opposite portions intermediate of the ends thereof being disconnected from the contiguous parts of said opposing spring arms, and a part of said segment intermediate of said opposite portions thereof being disconnected from a spring arm interposed between said opposing spring arms, substantially as and for the purpose specified.

13. A friction-clutch comprising driving and driven members including opposing surfaces, a part fixed relatively to one of the opposing surfaces and having a plurality of integral spring arms at one side, frictional engaging segments interposed between said part and the other of the opposing surfaces and arranged one in advance of the other in a ring-shaped series substantially concentric with said surfaces, contiguous edges of the segments being spaced apart, and one end of each segment being fixed relatively to one side of said part, and the opposite end being fixed to the free end of one of the spring arms, said segments being of greater width than the spring arms whereby a plurality of the spring arms engage a single segment and the free ends of the other of said spring arms being capable of free movement relatively to the segments, and means for moving one member axially relatively to the other, substantially as and for the purpose described.

In testimony whereof, I have hereunto signed my name in the presence of two attesting witnesses, at Syracuse, in the county of Onondaga, in the State of New York, this 29th day of November, 1905.

WILLARD C. LIPE.

Witnesses:
S. DAVIS,
R. ARONSON.